(12) United States Patent
Babineau, Jr. et al.

(10) Patent No.: US 8,567,154 B2
(45) Date of Patent: Oct. 29, 2013

(54) APPARATUS AND METHODS FOR MOUNTING A PHOTOVOLTAIC MODULE ON A ROOF

(75) Inventors: Francis John Babineau, Jr., Parker, CO (US); Ethan Nelson McGraw, Littleton, CO (US); Lester Mickel Aseere, Parker, CO (US)

(73) Assignee: Johns Manville, Denver, CO (US)

( * ) Notice: Subject to any disclaimer, the term of this patent is extended or adjusted under 35 U.S.C. 154(b) by 33 days.

(21) Appl. No.: 13/406,678

(22) Filed: Feb. 28, 2012

(65) Prior Publication Data

US 2013/0220395 A1    Aug. 29, 2013

(51) Int. Cl.
*E04B 1/00*    (2006.01)

(52) U.S. Cl.
USPC .......... 52/747.1; 52/173.3; 136/244; 126/622

(58) Field of Classification Search
USPC ............... 52/173.3, 747.1; 136/244; 126/621, 126/622, 623
See application file for complete search history.

(56) References Cited

U.S. PATENT DOCUMENTS

| | | | |
|---|---|---|---|
| 6,187,122 B1 * | 2/2001 | Hubbard et al. ................. | 156/82 |
| 7,307,209 B2 * | 12/2007 | Mapes et al. .................. | 136/251 |
| 8,191,320 B2 * | 6/2012 | Mittan et al. .................. | 52/173.3 |
| 8,209,919 B2 * | 7/2012 | Beck ............................ | 52/173.3 |
| 8,266,848 B2 * | 9/2012 | Miros et al. ................... | 52/173.3 |
| 8,347,565 B2 * | 1/2013 | Carroll ......................... | 52/173.3 |
| 8,397,448 B2 * | 3/2013 | Brown et al. ................. | 52/173.3 |
| 8,407,895 B2 * | 4/2013 | Hartelius et al. .......... | 29/890.033 |
| 2011/0068244 A1 * | 3/2011 | Hartelius et al. ........... | 248/298.1 |
| 2011/0072631 A1 * | 3/2011 | Hartelius et al. ................. | 29/428 |
| 2011/0073733 A1 * | 3/2011 | Hartelius et al. ........... | 248/298.1 |
| 2011/0079694 A1 * | 4/2011 | Hartelius et al. ......... | 248/229.26 |

* cited by examiner

*Primary Examiner* — William Gilbert
*Assistant Examiner* — Gisele Ford
(74) *Attorney, Agent, or Firm* — Robert D. Touslee (57) ABSTRACT

Embodiments of the invention provide systems, devices, and methods for mounting a photovoltaic module to a structure, such as a roof. An embodiment of a method for mounting a photovoltaic module to a structure may include providing a photovoltaic module, a first mounting device, and a second mounting device. The first mounting device and the second mounting device may be coupled with the structure, such as a roofing membrane, so that opposing mounting channels of the respective devices face one another. The method may further include inserting a first edge of the photovoltaic module within the mounting channel of the first mounting device and inserting a second edge of the photovoltaic module within the mounting channel of the second mounting device so that the photovoltaic module is disposed between the first mounting device and the second mounting device.

18 Claims, 5 Drawing Sheets

APPARATUS AND METHODS FOR MOUNTING A PHOTOVOLTAIC MODULE ON A ROOF

BACKGROUND OF THE INVENTION

This invention relates generally to attaching photovoltaic modules to a structure, such as a roof of a building. More specifically the invention relates to mounts for attaching photovoltaic modules to such structures.

Photovoltaic modules or panels are often positioned on the roof of a structure or building to convert solar energy to electrical energy in order to operate various equipment, machinery, lighting or other fixtures, and the like. Some photovoltaic modules (e.g., flexible photovoltaic modules) may be held in place atop the roof by adhesively bonding the photovoltaic modules to the roof's surface or mechanically fastening the photovoltaic modules directly to the roof's surface. Mechanically fastening the photovoltaic modules to the roof often produces holes through the photovoltaic modules and/or roof surface, which may compromise the performance of the photovoltaic modules and/or allow water of other fluids to penetrate through the roof or underneath the photovoltaic module. Adhesively bonding the photovoltaic modules to the roof's surface often permanently attaches the photovoltaic module to the roof's surface so that the photovoltaic module is not removable without damaging the roof's surface. Further, an installer must carefully place and properly align adhesively bonded photovoltaic modules on the roof's surface since the adhesives suitable for this purpose often aggressively bond with virtually any surface they contact. In addition, mechanically fastened and adhesively bonded photovoltaic modules often transfer stress to or receive stress from the roof's surface as the roof and photovoltaic modules expand and contract due to shifts in temperature and the like.

The use and/or desire for photovoltaic modules mounted on roof surfaces appears to be increasing as individuals and companies find ways to be more environmentally conscious. As such, there is a constant need for improved methods and systems for securing photovoltaic modules to roofs.

BRIEF SUMMARY OF THE INVENTION

Embodiments of the invention provide devices, systems, and methods for mounting a photovoltaic module to a structure, such as a roof of a building, a building cladding system, or any other substrate or surface suitable for supporting photovoltaic modules. In one aspect, embodiments of the invention provide a method for attaching a photovoltaic module to a structure, such as a roof. The method may include providing a photovoltaic module and providing a first mounting device having a longitudinal length and a transverse length and also including: a top surface, a bottom surface, a first longitudinal edge, a second longitudinal edge opposite the first longitudinal edge, and a mounting channel extending along at least a portion of the first longitudinal edge. The method may also include coupling the first mounting device with the structure, such as by coupling the first mounting device with a roofing membrane. The method may further include inserting a first edge of the photovoltaic module within the mounting channel of the first mounting device.

The first edge may be inserted within the mounting channel of the first mounting device so that a gap exists between the first edge and a rear surface of the mounting channel. The gap may allow sliding expansion of the photovoltaic module within the mounting channel. The first mounting device may also include a second mounting channel extending along at least a portion of the second longitudinal edge and the method may further include: providing a second photovoltaic module and inserting a first edge of the second photovoltaic module within the second mounting channel of the first mounting device so that the first mounting device is disposed between the respective photovoltaic modules. The first mounting device may further include a recessed channel extending along at least a portion of the top surface. The recessed channel may be disposed between the two mounting channels of the first mounting device and the method may further include folding the first mounting device along the recessed channel.

The method may additionally include providing a second mounting device configured similar to the first mounting device, coupling the second mounting device with the structure (e.g., the roofing membrane) so that a mounting channel of the second mounting device faces the mounting channel of the first mounting device, and inserting a second edge of the photovoltaic module within the mounting channel of the second mounting device so that the photovoltaic module is disposed between the first mounting device and the second mounting device. In one embodiment, inserting the first edge within the mounting channel of the first mounting device and inserting the second edge within the mounting channel of the second mounting device comprises sliding the photovoltaic module longitudinally with respect to the first and second mounting devices so that the first and second edges slide within respective mounting channels. The method may further include folding or rolling the first mounting device, the photovoltaic module, and the second mounting device so as to form a rolled or folded photovoltaic blanket.

The method may additionally include coupling a roofing membrane to the structure (e.g., roof) or coupling the roofing membrane to a second roofing membrane of the structure (e.g., roof). In one embodiment, coupling the first mounting device with the structure (e.g., roofing membrane) may include heat welding the first mounting device to the roofing membrane. In another embodiment, coupling the first mounting device with the structure (e.g., roofing membrane) may include adhesively bonding the first mounting device to the roofing membrane.

In another aspect, embodiments of the invention provide a system for attaching a photovoltaic module to a structure, such as a roof. The system may include a photovoltaic module, a first mounting device, and a second mounting device. The first mounting device may have a longitudinal length and a transverse length and may be coupled with the structure (e.g., a roofing membrane). The first mounting device may also include: a top surface, a bottom surface, a first longitudinal edge, a second longitudinal edge opposite the first longitudinal edge, and a mounting channel extending along at least a portion of the first longitudinal edge (or along the entire length) so that a first edge of the photovoltaic module may be inserted within the mounting channel. The second mounting device may be configured similar to the first mounting device and may also be coupled with the structure (e.g., the roofing membrane) so that a mounting channel of the second mounting device faces the mounting channel of the first mounting device. A second edge of the photovoltaic module opposite the first edge may be inserted within the mounting channel of the second mounting device so that the photovoltaic module is disposed between the first mounting device and the second mounting device.

The first mounting device may further include a second mounting channel extending along at least a portion (or the entire length) of the second longitudinal edge. A first edge of a second photovoltaic device may be inserted within the second mounting channel so that the first mounting device is disposed between two photovoltaic modules. The first mounting device may further include a recessed channel extending along at least a portion (or the entire length) of the top surface. The recessed channel may be disposed between the first mounting channel and the second mounting channel.

The photovoltaic module may be attached to the structure (e.g., roof) so that at least a portion of the photovoltaic module is supported above the structure's surface to allow air flow or water drainage under the photovoltaic module. The first edge of the photovoltaic module may be inserted within the mounting channel of the first mounting device in a manner that allows the photovoltaic module to slidingly expand or contract within the mounting channel. For example, the first edge of the photovoltaic module may be inserted within the mounting channel so that a gap exists between the first edge and a rear surface of the mounting channel. In one embodiment, the mounting channel of the first mounting device and/or the mounting channel of the second mounting device include a plurality of teeth that grip the photovoltaic module to releasably secure the photovoltaic module within the channel.

In another aspect, embodiments of the invention provide a device for attaching a photovoltaic module to a structure, such as a roof. The device may include a device body having a longitudinal length and a transverse length. The device body may couple with the structure (e.g., roof) and may include: a top surface, a bottom surface, a first longitudinal edge, a second longitudinal edge opposite the first longitudinal edge, and a first channel extending along at least a portion (or the entire length) of the first longitudinal edge. The first channel may be configured or arranged so that an edge of the photovoltaic module may be inserted therein to attach the photovoltaic module to the structure (e.g., the roof's surface).

The device or device body may also include a flange extending from the device body along at least a portion (or the entire length) of the second longitudinal edge. The device or device body may further include a second channel extending along at least a portion (or the entire length) of the second longitudinal edge of the device body. The second channel may be configured or arranged so that an edge of a second photovoltaic module may be inserted therein to attach the second photovoltaic module to the structure (e.g., the roof's surface). The device or device body may additionally include a third channel extending along at least a portion (or the entire length) of the top surface. The third channel may be disposed between the first channel and the second channel. In one embodiment, the device body may be folded along the third channel. In one embodiment, a plurality of teeth may be disposed within the first channel. The plurality of teeth may be configured or arranged to grip at least one surface of the photovoltaic module to releasably secure the photovoltaic module within the channel. The device may be configured so that at least a portion of the photovoltaic module is supported above the structure's surface (e.g., the roof's surface) when inserted within or otherwise coupled with the device body.

BRIEF DESCRIPTION OF THE DRAWINGS

The present invention is described in conjunction with the appended figures.

In the appended figures, similar components and/or features may have the same numerical reference label. Further, various components of the same type may be distinguished by following the reference label by a letter that distinguishes among the similar components and/or features. If only the first numerical reference label is used in the specification, the description is applicable to any one of the similar components and/or features having the same first numerical reference label irrespective of the letter suffix.

DETAILED DESCRIPTION OF THE INVENTION

The ensuing description provides exemplary embodiments only, and is not intended to limit the scope, applicability or configuration of the disclosure. Rather, the ensuing description of the embodiments will provide those skilled in the art with an enabling description for implementing one or more embodiments. It being understood that various changes may be made in the function and arrangement of elements without departing from the spirit and scope of the invention as set forth in the appended claims.

Also, it is noted that individual embodiments may be described as a process which is depicted as a flowchart, flow diagram, or block diagram. Although a flowchart may describe the operations as a sequential process, many of the operations can be performed in parallel or concurrently. In addition, the order of the operations may be re-arranged. A process may be terminated when its operations are completed, but could have additional steps not discussed or included in a figure. Furthermore, not all operations in any particularly described process may occur in all embodiments. A process may correspond to a method, a function, a procedure, etc.

Embodiments of the invention provide devices, systems, and methods for mounting a photovoltaic module to a structure, such as a roof of a building, a building cladding system, or any other substrate or surface suitable for supporting photovoltaic modules. For convenience, these structures will be generally described herein as "roofs", although it should be realized that these structure, and the term "roof", may include virtually any substrate or surface suitable for supporting photovoltaic modules. Similarly, the term photovoltaic module is meant to include any structure that is capable of generating electrical power from solar or light energy. Photovoltaic modules may also be described as solar panels, solar modules, solar cells, photovoltaic panels, photovoltaic cells, and the like. The photovoltaic modules (PV modules or panels) are placed on the roof surface to convert light energy (e.g., sunlight) to electrical energy in order to operate various machinery or equipment, power lights, and the like.

The mounting devices and structures described herein allow PV modules to be attached to the roofs surface without adhesively or mechanically bonding the module body to the roof surface. In other words, adhesives are not applied directly to the PV module and/or holes are not drilled through the PV module to attach the PV module to the roof surface. Rather, the mount, or a series of mounts, are attached to the roof surface and the PV modules are inserted into one or more openings or channels of the mount(s).

In some embodiments, the PV modules may be individually removed from the mounts for replacement, repair, inspection, and the like. The mounts also may be removed from the roof surface with minimal or no damage to the surface. One advantage of the mounts described herein is that individual PV modules may be removed or uncoupled from the roof's surface if the PV module stops working for any reason or has other problems. Conventional methods that adhesively bond PV modules to the roof's surface do not typically allow the PV modules to be removed for any reason without seriously damaging or affecting the roof's surface.

The mounts may be configured to correspond to the shape and size of the PV modules. For example, the mounts may have a longitudinal length approximately equivalent to the PV modules. The PV modules may be inserted within the opening or channel of the mounts so that the PV modules are able to expand and/or contract within the opening or channel. For example, in some embodiments, as the PV module expands or contracts, the PV module slides within opening or channel. This results in no stress or minimal stress being transferred to the roof surface as the PV module expands and/or contracts, or vice versa.

In some embodiments, the openings or channels of the mounts include securing structures, such as teeth, that facilitate in griping the PV module to secure the PV module within the mount. In other embodiments, the opening or channels do not include teeth so that the PV module may be easily removed from the mount and/or easily slide within the openings or channels.

In some embodiments, the mounts include two openings or channels that each are configured to receive a PV module so that the mount is positioned between adjacent PV modules. The mounts may also include a flange or recessed central portion that may facilitate in folding of the mounts and attached PV modules and/or provide a location where the mount may be coupled with the roof surface. In some embodiments, coupling or attaching the mount to the roof surface may include applying one or more adhesives to the mount and bonding the mount with the roof surface. In other embodiments, the mount may be heat welded to the roof surface or mechanically attached using one or more fasteners, such as rivets, bolts, screws, nails, and the like. One advantage of heat welding or adhesively bonding the mount to the roof surface may be the elimination of holes through the mounts, PV modules, and/or roof surface, which may preserve a water tight roof seal.

In some embodiments, the PV modules may be flexible or semi-flexible panels or substrates as known in the art, although the mounts described herein may be used to attach any PV modules (e.g., rigid, semi-rigid, and the like) to a roof surface.

When attached to the roof surface, the mount may support a portion or all of the PV module above the roof surface. This may allow air to flow underneath the PV module for cooling, air pressure equalization, and the like, and/or allow water to flow or drain from underneath the PV module. In one embodiment, a series of mounts may be arranged on a roof surface in an approximately parallel manner so that the openings or channels of opposing mounts face each other. The mounts may be heat welded or adhesively bonded to the roof surface and a PV module may be inserted within the opening of each mount so that a PV module is positioned between opposing mounts. In one embodiment, the PV modules are slid longitudinally within the openings or channels of the mounts, although in other embodiments the PV modules are inserted transversely within the openings or channels. In one embodiment, the mounts are coupled with flat roofs or low slope or low pitch roofs, which in one embodiment comprises roofs with a slope of 3-in-12 or less.

The mounts may be made of a flexible material (e.g., Thermoplastic PolyOlefin (TPO), Polyvinyl Chloride (PVC), and the like) so that the mount and PV modules may be folded and/or rolled into a blanket product. In one embodiment, the mounts may be made from any polymer that is compatible with typical singly ply roofing membranes so as to enable the mounts to be heat welded to the membrane. Similarly, the mounts and PV modules may be coupled or attached to a roofing membrane (e.g., Modified Bitumen, Synthetic Rubber (EPDM and the like), Thermoplastic Membrane (TPO, CPE, CPA, and the like)), which may be folded or rolled with the mounts and PV modules into a blanket product or systems. Having described several embodiments, of the invention, additional aspects will be apparent with reference to the figures.

Figure 1A:
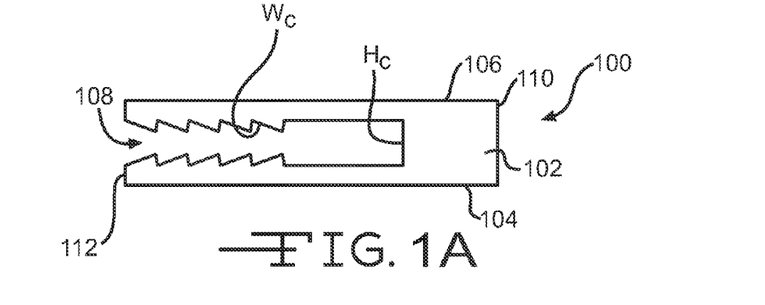
FIGS. 1A-1C illustrate perspective views of various embodiments of a mount for attaching a photovoltaic module to a roof.
Figure 1B:
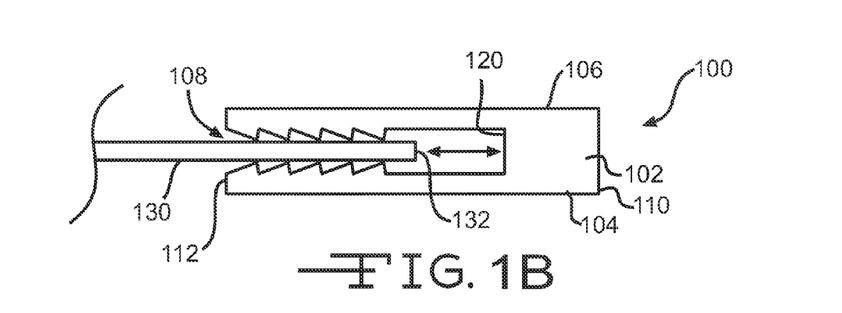
Figure 1C:
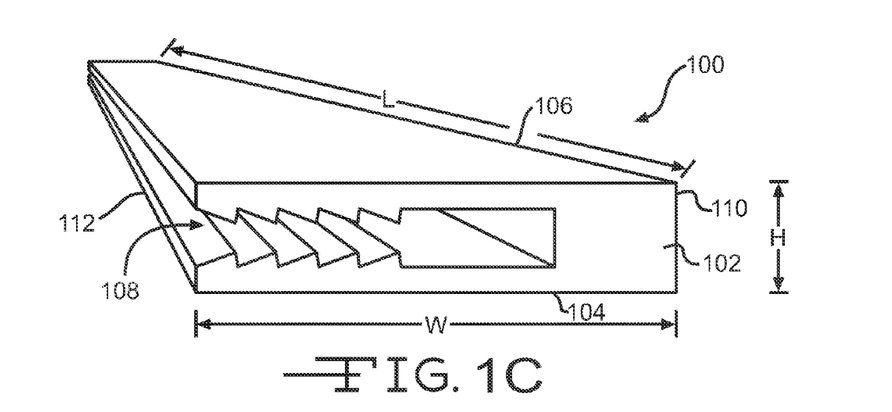

Referring now to FIGS. 1A-1C, illustrated are various embodiments of a mount 100 that may be attached to a roof surface to mount or attach a PV module 130 to the roof surface. An example of PV module 130 is the product PVL-144 PV laminate manufactured by Uni-Solar™, although any PV module may be used. In FIG. 1A, mount 100 includes a body 102 having a top surface 106, a bottom surface 104, a left side 112, and a right side 110. Mount 100 may have a longitudinal length L that corresponds to the longitudinal length of PV module 130, which in some embodiments may be between about 5 and 30 feet, between about 10 and 25 feet, between about 15 and 20 feet, and the like. Mount 100 may also have a transverse length W that allows mount 100 to support and/or grip an edge 132 of PV module 130. In some embodiments, the transverse length W may be between about 0.5 and 10 inches, between about 1 and 5 inches, about 2 inches, and the like. Mount 100 may also have a height H sized larger than the a height of PV module 130 to allow PV module 130 to be inserted within channel 108. In some embodiments, height H may be between about 0.2 and 6 inches, between about 0.2 and 2 inches, about 0.5 inches, and the like. Height H may depend on the type of PV module 130 being attached to the roof surface. For example, height H may be about 0.5 inches when a thin flexible PV module is being attached to the roof surface and may be about 4-6 inches when a thick rigid PV module is being attached to the roof surface. The shape and size of mount 100 and/or PV module 130 may be custom fit to the particular roof and/or application for which it is being applied.

Body 102 includes a channel or opening 108 positioned on one side of the mount (shown as positioned on left side 112) within which edge 132 of PV module 130 may be inserted as shown in FIG. 1B. Channel 108 may have a transverse length $W_c$ and a height $H_c$ that allow edge 132 of PV module 130 to be inserted within channel 108. In some embodiments, transverse length $W_c$ is between about 0.5 and 4 inches, between about 1 and 2 inches, about 1.5 inches, and the like. Liekwise, in some embodiments, height $H_c$ is between about 0.1 and 4 inches, about 0.2 and 1 inch, about 0.25 inches, and the like. The configuration of transverse length $W_c$ and/or height $H_c$ may depend on the configuration of the PV module 130 (e.g., flexible, rigid, and the like) being attached to the roof and/or on one or more properties of the roof. These dimensions may also be selected depending on the type of fit desired between mount 100 and PV module 130. For example, smaller dimensions may be selected for height $H_c$ when a tight fit (e.g., interference fit) is desired between PV module 130 and channel 108, such as when PV module 130 is being mounted to a higher sloped roof, or larger dimensions may be selected for height $H_c$ when more sliding freedom between PV module 130 and channel 108 is desired. The dimensions for transverse length $W_c$ may likewise be selected depending upon the application or use, such as depending on the amount of contact desired between PV module 130's edge 132 and the inner surface of channel 108. In one embodiment, channel 108 may be designed so that the distal ends of the struts or flanges of channel 108 taper toward one another. In other words, the struts or flanges may taper so that the distal ends of channel 108 are closer together than a rear surface 120 of channel 108. Such a design may allow the distal ends of channel 108 to grip the surface of a PV module 130 inserted within channel 108.

Mount 100 made of a flexible material (e.g., PVC, TPO, and the like) so that it may be folded and/or rolled with PV module 130 to reduce the size of the coupled components. In some embodiments, mount 100 may be adhesively bonded and/or heat welded to a roofing membrane (e.g., TPO, PVC, EPDM, and the like). PV module 130 may be inserted within channel 108 before or after mount 100 is attached to the roof surface. For example, PV module 130 may be inserted within channel 108 by sliding PV module 130 longitudinally along mount 100 within channel 108. In other embodiments, edge 132 is inserted transversely within channel 108 after mount 100 is attached to the roof's surface.

In some embodiments, the longitudinal ends of mount 100 may be open to allow PV module 130 to inserted and/or removed by longitudinally sliding PV module 130 within channel 108. In other embodiments, one or both of the longitudinal ends may be capped or closed to prevent removal of PV module 130 in one or both longitudinal directions. Mount 100 may be manufactured using various techniques known in the art, such as extruding reinforced or unreinforced plastic. In one embodiment, mount 100 is made of a metal material, which may or may not including a coating such as, for example, a plastic coating.

FIG. 1B illustrates edge 132 of PV module 130 inserted within channel 108. In some embodiments, edge 132 of PV module 130 may be inserted within channel 108 so that a gap exists between edge 132 and a rear surface 120 of channel 108. This gap may allow PV module 130 to slide within channel 108 (shown by the double sided arrow) as PV module 130 expands and/or contracts due to temperature change and the like, and/or may allow mount 100 to slide with respect to PV module 130 as mount 100 expands and contracts. Since in some embodiments, PV module 130 and mount 100 may be made of different materials that have different coefficients of thermal expansion, the ability of PV module 130 to slide within channel 108 may result in little to no force being transferred between PV module 130 and mount 100 due to differences in expansion and/or contraction between these structures. Thus, no stress or minimal stress may be applied to PV module 130 and/or mount 100 as these structures expand and/or contract, thereby eliminating or minimizing buckling or wrinkling of PV module 130 and/or the roof's surface, or other potential problems. In some embodiments, sliding engagement of PV module 130 within channel 108 is maximized (i.e., sliding friction is minimized) by sizing channel 108 larger or slightly larger than a width of PV module 130. In some embodiments, PV module 130 is inserted within channel 108 so that edge 132 extends into channel 108 between about 0.25 and about 2 inches, between about 0.5 and 1.5 inches, about 1 and 1.25 inches, and the like. In a specific embodiment, transverse length $W_c$ of channel 108 is approximately 1.5 inches and PV module 130 is into channel 108 to about 1-1.25 inches leaving a 0.25 inch gap between edge 132 and rear surface 120.

FIG. 1C illustrates an embodiment of mount 100 where channel 108 includes a plurality of teeth 114 that may be used to grip the surface of PV module 130, or otherwise secure PV module 130 within channel 108. As shown in FIG. 1C, teeth 114 may be configured so that each tooth faces rear surface 120 to allow easy insertion of PV module 130 while providing at least some resistance to removal. In other embodiments, the inner edge of each tooth may include a radius, chamfer, round, and the like that provides some resistance to removal, but still allows PV module 130 to slide within channel 108 as the module expands and contracts. Instead of teeth 114, channel 108 may include one or more half cylinders, struts, elongate members, grip pads or strips, and the like, that provide some resistance to removal while also providing sliding engagement of PV module 130 within channel 108. Teeth 114 or other securing feature may help secure PV module 130 against wind uplift forces and/or lateral movement. Teeth 114 or other securing feature can releasably secure PV module 130 while allowing some degree of sliding movement within channel 108.

Using conventional PV module attachment methods (e.g., adhesive bonding, mechanically fastening, and the like), any strain that results from the photovoltaic module expanding or contracting at a different rate than the roof is generally absorbed by the module or roofing membrane, which may result in buckling or wrinkling of the module, roofing membrane, or the surrounding roof structure. Because of the sliding engagement of PV module 130 within channel 108 of mount 100, virtually no strain or a minimal amount of strain is transferred from the roof or mount 100 to PV module 130, or vice versa.

Figure 2:
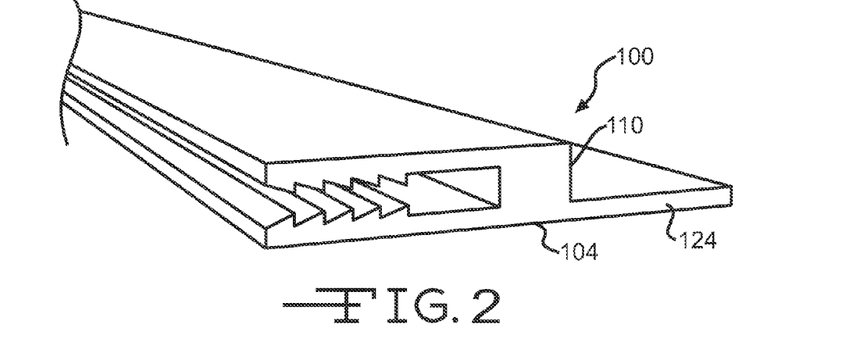
FIGS. 2-4 illustrate perspective views of other embodiments of a mount for attaching a photovoltaic module to a roof according to embodiments of the invention.

Referring now to FIG. 2, illustrated is another embodiment of mount 100 including a lip or flange 124 that extends from the right side 110 and/or bottom surface 104. Flange 124 may be configured to be directly adjacent the roof's surface (or a surface of a roofing membrane) and/or may provide an additional bonding surface to facilitate bonding of mount 100 to the roof surface. In addition, the small cross section profile of flange 124 may be easily heat welded with a roofing membrane since thermal resistance is minimized and/or may allow a heat welding machine to longitudinally traverse mount 100 and heat weld flange 124 to a roofing membrane.

Figure 3:
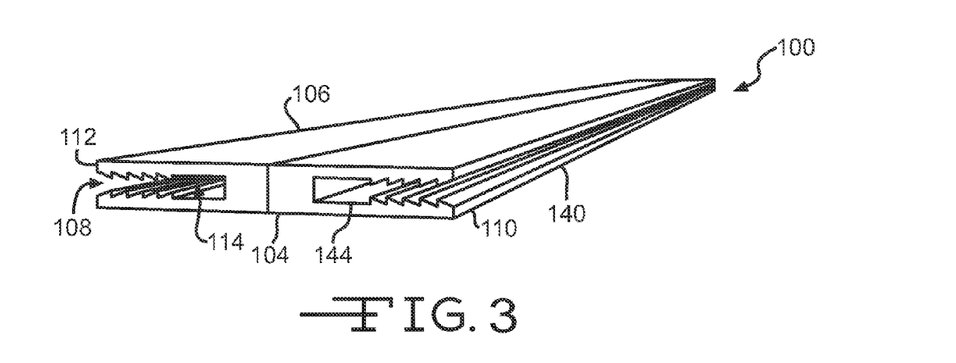
Figure 6:
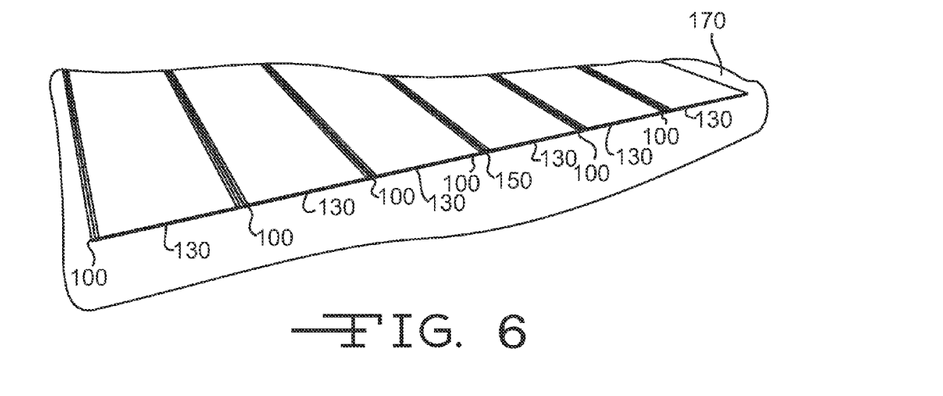
FIG. 6 illustrates a perspective view of a plurality of photovoltaic modules being coupled with a plurality of mounts to form a photovoltaic system or array.

Referring now to FIG. 3, illustrated is an embodiment of mount 100 having a second channel 140 positioned on right side 110 to allow a second PV module to be coupled with mount 100 so that mount 100 is positioned between two PV modules. As shown in FIG. 6, the use of a mount 100 having double sided channels, 108 and 140, allows a plurality of PV modules 130 to be coupled in a series to form a photovoltaic system, array, or blanket. Mount 100 shown in FIG. 3 may have transverse length W approximately twice that described above. The other dimensions (e.g., longitudinal length L, height H, transverse length $W_c$, and height $H_c$) may be similar to those described above. Mount 100 of FIG. 3 may be a single structure or component (e.g., extruded reinforced or unreinforced plastic, a metal material, a plastic coated metal material, and the like) or may include two mounts butt welded or bonded together. Channel 140 may or may not include teeth 144 or other securing features as described above to secure a PV module within channel 140. In one embodiment, one of the channels (i.e., 108 or 140) may include teeth or other securing features while the other does not.

Figure 4:
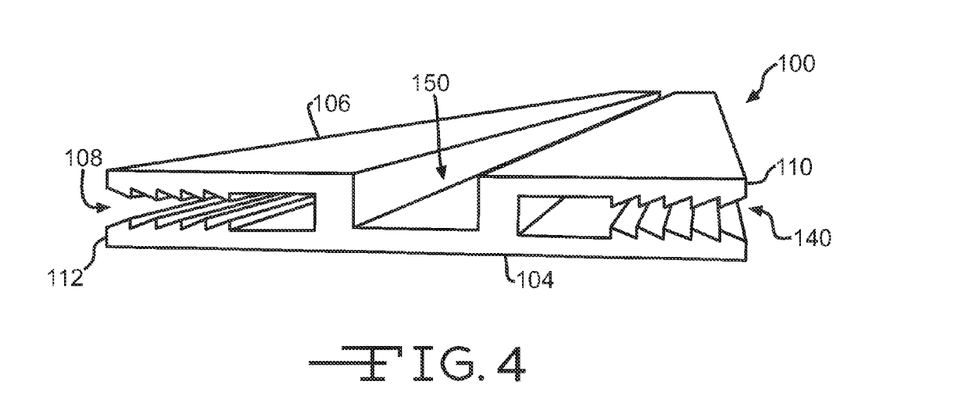

Referring now to FIG. 4, illustrated is an embodiment of a mount 100 similar to the mount of FIG. 3 having a recessed central portion or central channel 150 positioned between channels, 108 and 140, that extends along a portion of or the entire longitudinal length of mount 100. Recessed central portion 150 has a smaller cross sectional profile (i.e., is thinner) than the remainder of mount 100 which may allow recessed central portion 150 to flex more than the remainder of mount 100. Recessed central portion 150 may provide a buckle or bend point for mount 100 so as to allow the mount to be folded or rolled as described herein. In some embodiments, recessed central portion 150 allows mount 100 to be folded up to 180 degrees so that opposing ends of bottom surface 104 (or top surface 106) may touch.

Additionally, recessed central portion 150 provides an increased surface area to heat weld and/or adhesively bond mount 100 to the roof surface, and/or provide a small cross sectional profile that may facilitate heat welding of mount 100 to a roofing membrane by providing a region with minimal thermal resistance compared to the remainder of mount 100. Recessed central portion 150 may allow the spacing between adjacent PV modules to be controlled and/or adjusted to a defined amount, which may allow a given number of PV modules to be installed within a defined area. Mount 100 of FIG. 4 may be a single structure or component (e.g., extruded reinforced or unreinforced plastic, a metal material, a plastic coated metal material, and the like) or a combination of mounts spaced apart and welded or coupled together. Recessed central portion 150 may be sized depending on the need and/or application. For example, recessed central portion 150 may be large (e.g., 1-3 inches, and the like) when increased flexibility is desired, or may be sized smaller (e.g., 0.25-1 inch, and the like) when minimal separation between adjacent PV modules is desired.

Figure 5:
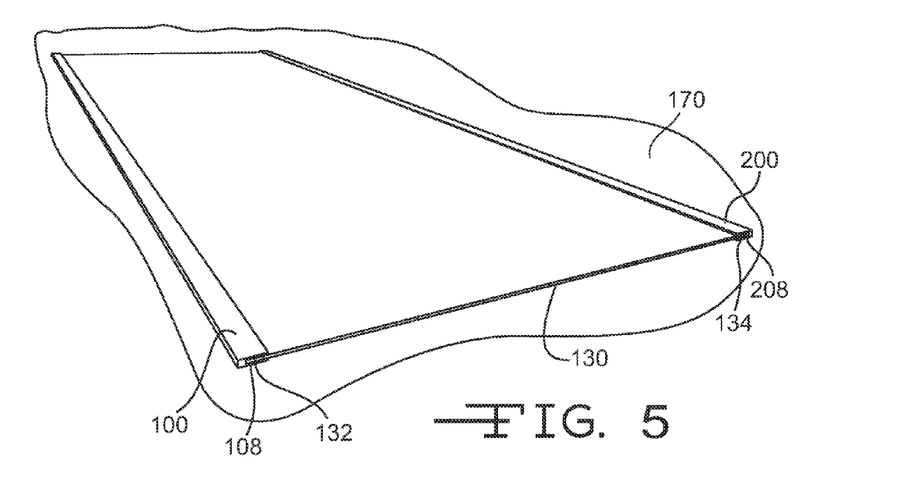
FIG. 5 illustrates a perspective view of a photovoltaic module coupled with two mounts.

Referring now to FIG. 5, illustrated are two mounts, 100 and 200, coupled with a roofing membrane 170 so that respective channels, 108 and 208, of mounts, 100 and 200, face each other. Inserted within channels, 108 and 208, are opposing edges, 132 and 134 respectively, of PV module 130 so that PV module 130 is positioned between the two mounts, 100 and 200. Roofing membrane 170 may be the membrane or outer surface of a pre-existing roof or may be separate therefrom and subsequently attached to the roof or a roofing membrane/outer surface of the roof. In this manner, mounts, 100 and 200, and PV module 130 may be installed to a roof surface on site or may be installed onto a roofing membrane 170 offsite and subsequently attached to the roof. Mounts, 100 and 200, may support PV module 130, or a portion thereof, slightly above the roof's surface, and/or one or both longitudinal ends may be open, so that air may flow under PV module to cool PV module 130, equalize pressure, and the like, and/or so that water or other fluids may drain from underneath PV module 130. As described above, in some embodiments, PV module 130 may be inserted or withdrawn from channels, 108 and/or 208, by longitudinally sliding PV module 130 within these channels. In one embodiment, coupled PV module 130 and mounts, 100 and 200, may have a longitudinal length of about 18 feet and a transverse length of about 16 inches, although various other sizes and configurations are possible. As described above, PV module 130 may be inserted within channels, 108 and/or 208, so that a gap exists between edges, 132 and/or 134, and a respective rear surface of channels, 108 and/or 208, so that PV module may slide within the channels during expansion and/or contraction.

In one embodiment, only the mounts, 100 and 200, are coupled with the roof's surface or a roofing membrane via adhesive bonding, heat welding, and the like. In other words, the PV module 130 is not necessarily directly bonded or attached with the roof, but rather supported by the attached mounts, 100 and 200. As described above, using conventional attachment methods where the PV module is adhesively bonded to the roof, the adhesives aggressively bond with the first surface they contact. Thus, an installer must carefully and closely align the PV module with the roof's surface before attaching the module to the roof's surface to ensure that the PV module is not improperly or inaccurately attached to the roof. In the embodiments described herein, since only the mounts, 100 and 200, are attached to the roof and not the entire PV module 130, the tolerance for attaching the PV module is increased. Put another way, since the PV module 130 is not adhered directly to the roof's surface, attaching the PV module 130 is appreciable easier than with conventional attachment methods since an installer only need worry about attaching the individual mounts rather than the entire PV module. Installation is further simplified because PV module 130 may be inserted within channels, 108 and 208, so that a gap exists between edges, 132 and/or 134, and respective rear surfaces of channels, 108 and/or 208, thereby allowing room for some installation error. Thus, since mounts, 100 and 200, are coupled with the roof's surface and not the PV module 130 (and/or since the mounts, 100 and 200, may be coupled offsite with a roofing membrane that is subsequently attached to the roof), a greater degree of freedom is allowed in attaching the PV module to the roof.

Further, using conventional adhesive methods often permanently bonds or adheres the PV module to the roof's surface. In contrast, mounts, 100 and 200, allow PV module 130 to be quickly and easily removed and/or replaced since they may be easily uncoupled from (e.g., slid out of) channels, 108 and 208. Thus, if a PV module is damaged or needs repair or inspection, the module may be removed and a new or repaired PV module inserted within the channels.

An additional benefit is that PV module 130 may be mounted to the roof without putting holes through the PV module. The inclusion of holes in conventional methods may compromise the performance of the photovoltaic module and/or the weather tightness of the photovoltaic system or roofing system. Weather tightness may generally refer to rain or other environmental conditions accessing and potentially compromising the photovoltaic module and/or roof.

In another embodiment, one or two additional shorter length mounts (not shown) may be coupled with one or both longitudinal ends of PV module 130 so that three edges of PV module 130 are inserted within a channel of a respective mount or all four edges of PV module 130 are inserted within a channel of a respective mount. In other words, three mounts may be coupled with PV module 130 so that only one end of PV module 130 is open, or four mounts may be coupled with PV module 130 so that mounts extend around the entire perimeter of PV module 130 and no ends are open. The use of additional mounts may provide further protection against wind uplift forces and may be especially useful in high or strong wind areas.

Referring now to FIG. 6, illustrated is a photovoltaic system or array including a plurality of coupled PV modules 130 and mounts 100. The coupled PV modules 130 and mounts 100 may be further coupled to a roofing membrane 170, which may comprise the roof's outer surface or a membrane separate therefrom that is subsequently attached to the roof, roofing membrane, or other outer surface of the roof. Mounts 100 may be similar to those described above and the system or array may include any combination of those mounts. For example, in one embodiment, the end mounts may be any of the single sided mounts 100 described in FIGS. 1A-1C and FIG. 2, while the interior mounts 100 include any combination of the double sided mounts described in FIGS. 3 and 4. A centrally located mount 100 may include the recessed central portion 150 so as to allow the system or array to be folded along the recessed central portion 150, or to facilitate rolling of the system or array. The other interior mounts may or may not include the recessed central portion 150 depending on whether the system or array is to be folded at that point and/or depending on the spacing requirements between adjacent PV modules 130. Likewise, some or all of the channels may include teeth that help secure the PV modules within respective channels, and/or the PV modules may inserted within respective channels so as to provide sliding engagement with the channels during expansion and/or contraction of the PV modules and/or mounts. In an exemplary embodiment, the ends of the system or array do not include mounts 100, or only include one mount. Rather, these systems or arrays only include interior mounts 100 or include a single end mount 100.

The PV modules 130 and mounts 100 may be arranged in an approximately parallel manner and folded or rolled to form a photovoltaic blanket that may be transported to a job site and quickly and conveniently installed on site. In one embodiment, the photovoltaic blanket may be cut to size on site and subsequently installed. The photovoltaic blankets may have a transverse length of between about 4 and 20 feet, and more commonly about 10 feet, and may have a longitudinal length of between about 5 and 30 feet, and more commonly about 18 feet. The system or array may support the PV modules 130, or a portion of one or more the PV modules, above the roof's surface to promote air flow, fluid drainage, and the like, as described herein.

Figure 7A:
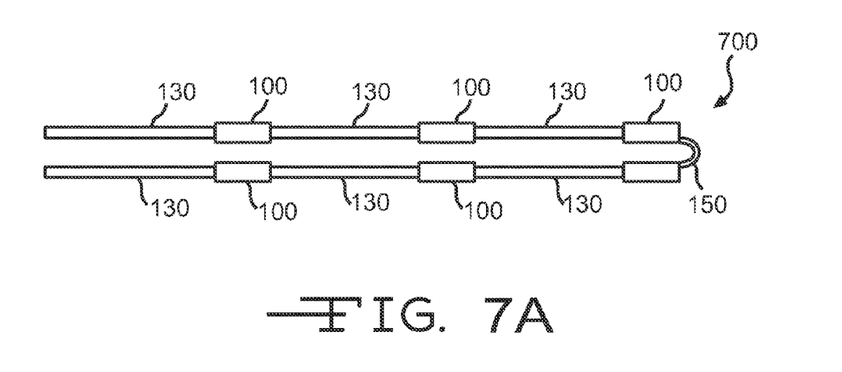
FIGS. 7A-7B illustrate the photovoltaic system or array of FIG. 6 being folded or rolled.
Figure 7B:
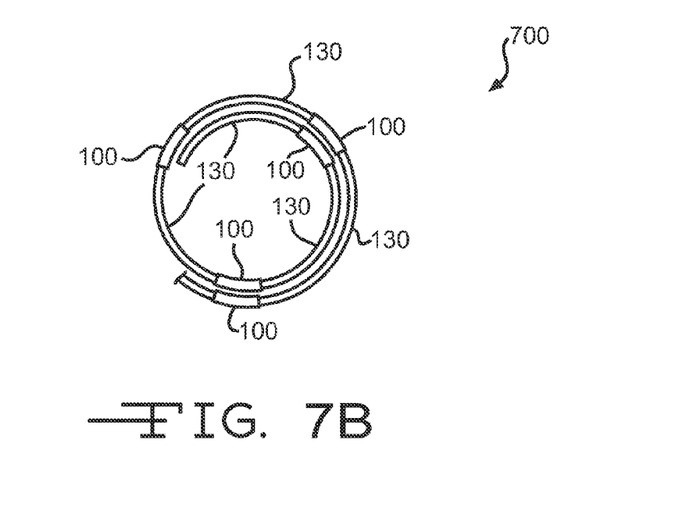

Referring now to FIGS. 7A and 7B, illustrated is a photovoltaic blanket 700 being either folded as in FIG. 7A or rolled as in FIG. 7B so as to minimize the space requirement of blanket 700. FIG. 7A further illustrates blanket 700 without mounts 100 on opposing ends of the blanket (i.e., having only interior mounts) as described above. Mounts 100 may be flexible to facilitate folding or rolling of blanket 700, although flexible mounts are not necessarily required. In FIG. 7A, blanket 700 is folded along recessed central portion 150. The mounts 100 of FIG. 7B may likewise include recessed central portions 150 to facilitate rolling. In some embodiments, blanket 700 is folded as in FIG. 7A when rigid or semi-rigid PV modules 130 are used, while blanket 700 is rolled as in FIG. 7B when more flexible PV modules 130 are used.

Figure 8:
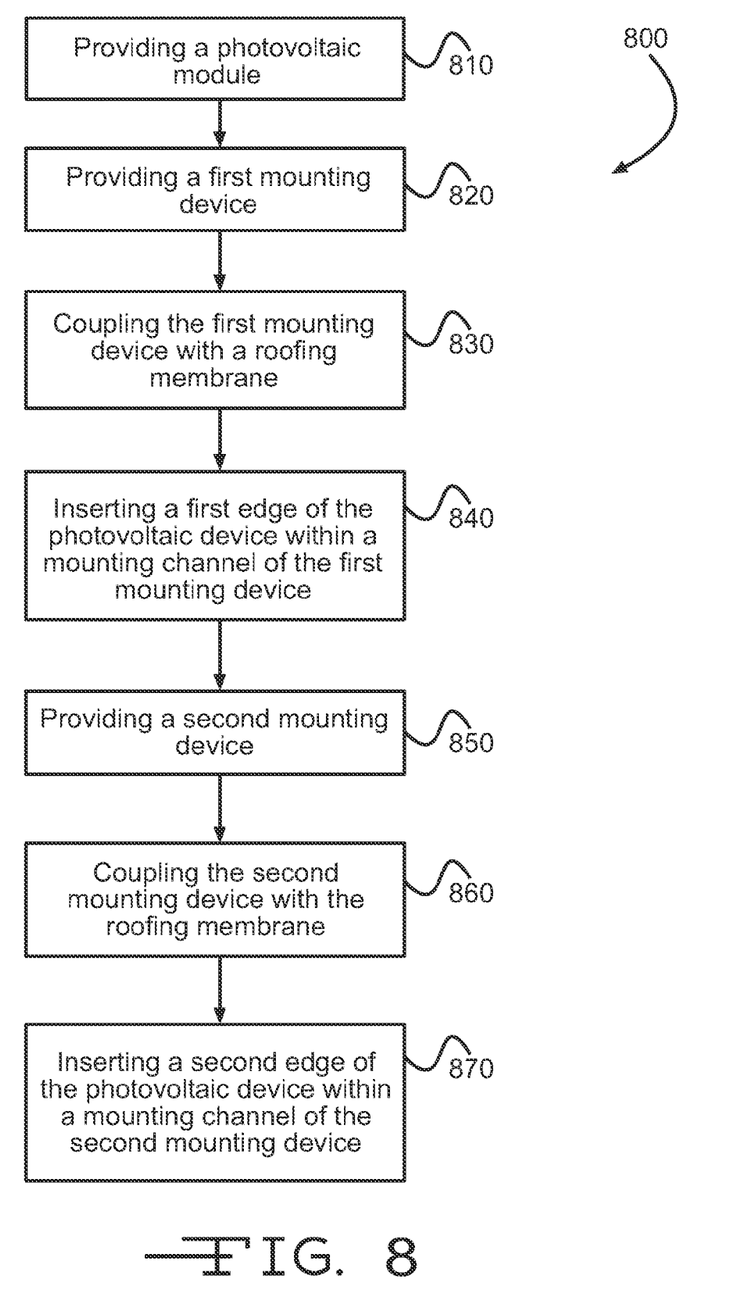
FIG. 8 illustrates a method for attaching a photovoltaic module to a roof of a building or structure.

Referring now to FIG. 8, illustrated is a method 800 for attaching a photovoltaic module to a roof. At block 810, a photovoltaic module is provided. At block 820, a first mounting device is provided. The first mounting device may be similar to any of the mounts described herein and may specifically have a longitudinal length, a transverse length, a top surface, a bottom surface, a first longitudinal edge, a second longitudinal edge opposite the first longitudinal edge, and a mounting channel extending along at least a portion of the first longitudinal edge. The first mounting device may be single sided or double sided and/or include a flange or recessed central portion. At block 830, the first mounting device is coupled with a roofing membrane. At block 840, a first edge of the photovoltaic module is inserted within the mounting channel of the first mounting device.

At block 850, a second mounting device is provided. The second mounting device may be configured similar to the first mounting device. In one embodiment, the first mounting device may be a single sided mounting device while the second mounting device is double sided. In another embodiment, both mounting device are single or double sided. At block 860, the second mounting device is coupled with the roofing membrane so that a mounting channel of the second mounting device faces the mounting channel of the first mounting device. At block 870, a second edge of the photovoltaic module is inserted within the mounting channel of the second mounting device so that the photovoltaic module is disposed between the first mounting device and the second mounting device.

The method may also include coupling the roofing membrane to the roof or coupling the roofing membrane to a second roofing membrane of the roof. The method may further include folding or rolling the first mounting device, the photovoltaic module, and the second mounting device so as to form a rolled or folded photovoltaic blanket. In some embodiments, the first mounting device includes a second mounting channel extending along at least a portion of the second longitudinal edge. In such embodiments, the method may further include providing a second photovoltaic module and inserting a first edge of the second photovoltaic module within the second mounting channel of the first mounting device so that the first mounting device is disposed between the respective photovoltaic modules. In such embodiments, the first mounting device may additionally include a recessed channel that extends along at least a portion of the top surface. The recessed channel may be disposed between the mounting channel and the second mounting channel and the method may additionally include folding the first mounting device along the recessed channel so that the photovoltaic modules on both sides of the first mounting device are adjacent one another. Alternatively, the photovoltaic modules and mounting devices may be rolled.

In some embodiments, inserting the first edge within the mounting channel of the first mounting device and inserting the second edge within the mounting channel of the second mounting device include sliding the photovoltaic module longitudinally with respect to the first and second mounting devices so that the first and second edges slide within respective mounting channels. In some embodiments, the first edge is inserted within the mounting channel of the first mounting device so that a gap exists between the first edge and a rear surface of the mounting channel. The gap may allow sliding expansion of the photovoltaic module within the mounting channel as described herein.

In some embodiments, coupling the first mounting device with the roofing membrane includes heat welding the first mounting device to the roofing membrane or adhesively bonding the first mounting device to the roofing membrane. In some embodiments, the mounting channel of the first mounting device and/or the mounting channel of the second mounting device include a plurality of teeth that are configured to grip the photovoltaic module to releasably secure the photovoltaic module within the channel.

Having described several embodiments, it will be recognized by those of skill in the art that various modifications, alternative constructions, and equivalents may be used without departing from the spirit of the invention. Additionally, a number of well-known processes and elements have not been described in order to avoid unnecessarily obscuring the present invention. Accordingly, the above description should not be taken as limiting the scope of the invention.

Where a range of values is provided, it is understood that each intervening value, to the tenth of the unit of the lower limit unless the context clearly dictates otherwise, between the upper and lower limits of that range is also specifically disclosed. Each smaller range between any stated value or intervening value in a stated range and any other stated or intervening value in that stated range is encompassed. The upper and lower limits of these smaller ranges may independently be included or excluded in the range, and each range where either, neither or both limits are included in the smaller ranges is also encompassed within the invention, subject to any specifically excluded limit in the stated range. Where the stated range includes one or both of the limits, ranges excluding either or both of those included limits are also included.

As used herein and in the appended claims, the singular forms "a", "an", and "the" include plural referents unless the context clearly dictates otherwise. Thus, for example, reference to "a process" includes a plurality of such processes and reference to "the device" includes reference to one or more devices and equivalents thereof known to those skilled in the art, and so forth.

Also, the words "comprise," "comprising," "include," "including," and "includes" when used in this specification and in the following claims are intended to specify the presence of stated features, integers, components, or steps, but they do not preclude the presence or addition of one or more other features, integers, components, steps, acts, or groups.

What is claimed is:

1. A method for attaching a photovoltaic module to a structure comprising:
    providing a photovoltaic module;
    providing a first mounting device having a longitudinal length and a transverse length and including:
        a top surface;
        a bottom surface;
        a first longitudinal edge;
        a second longitudinal edge opposite the first longitudinal edge; and
        a mounting channel extending along at least a portion of the first longitudinal edge;
    coupling the first mounting device with the structure;
    inserting a first edge of the photovoltaic module within the mounting channel of the first mounting device;
    providing a second mounting device configured similar to the first mounting device;
    coupling the second mounting device with the structure so that a mounting channel of the second mounting device faces the mounting channel of the first mounting device; and
    inserting a second edge of the photovoltaic module within the mounting channel of the second mounting device so that the photovoltaic module is disposed between the first mounting device and the second mounting device; and
    folding or rolling the first mounting device, the photovoltaic module, and the second mounting device so as to form a rolled or folded photovoltaic blanket.

2. The method of claim 1, wherein coupling the first mounting device with the structure comprises coupling the first mounting device with a roofing membrane.

3. The method of claim 2, further comprising coupling the roofing membrane to a roof or coupling the roofing membrane to a second roofing membrane of the roof.

4. The method of claim 1, wherein inserting the first edge within the mounting channel of the first mounting device and inserting the second edge within the mounting channel of the second mounting device comprises sliding the photovoltaic module longitudinally with respect to the first and second mounting devices so that the first and second edges slide within respective mounting channels.

5. The method of claim 1, wherein the first edge is inserted within the mounting channel of the first mounting device such that a gap exists between the first edge and a rear surface of the mounting channel, the gap allowing sliding expansion of the photovoltaic module within the mounting channel.

6. The method of claim 1, wherein the first mounting device further comprises a second mounting channel extending along at least a portion of the second longitudinal edge, and wherein the method further comprises:
    providing a second photovoltaic module; and
    inserting a first edge of the second photovoltaic module within the second mounting channel of the first mounting device so that the first mounting device is disposed between the respective photovoltaic modules.

7. The method of claim 6, wherein the first mounting device further comprises a recessed channel extending along at least a portion of the top surface, the recessed channel being disposed between the mounting channel and the second mounting channel, and wherein the method further comprises folding the first mounting device along the recessed channel.

8. The method of claim 2, wherein coupling the first mounting device with the roofing membrane comprises heat welding the first mounting device to the roofing membrane.

9. The method of claim 2, wherein coupling the first mounting device with the roofing membrane comprises adhesively bonding the first mounting device to the roofing membrane.

10. A rolled or folded photovoltaic blanket product comprising:
    a photovoltaic module;
    a first mounting device having a longitudinal length and a transverse length, the first mounting device being coupled with a roofing membrane and including:
        a top surface;
        a bottom surface;
        a first longitudinal edge;
        a second longitudinal edge opposite the first longitudinal edge; and
        a mounting channel extending along at least a portion of the first longitudinal edge, wherein a first edge of the photovoltaic module is inserted within the mounting channel; and
    a second mounting device configured similar to the first mounting device; the second mounting device being coupled with the roofing membrane so that a mounting channel of the second mounting device faces the mounting channel of the first mounting device, wherein a second edge of the photovoltaic module opposite the first edge is inserted within the mounting channel of the second mounting device so that the photovoltaic module is disposed between the first mounting device and the second mounting device, the first mounting device, the photovoltaic module, and the second mounting device being rolled or folded to form the photovoltaic blanket product.

11. The photovoltaic blanket product of claim 10, wherein the first mounting device further comprises a second mounting channel extending along at least a portion of the second longitudinal edge, wherein a first edge of a second photovoltaic device is inserted within the second mounting channel so that the first mounting device is disposed between two photovoltaic modules.

12. The photovoltaic blanket product of claim 11, wherein the first mounting device further comprises a recessed channel extending along at least a portion of the top surface, the recessed channel being disposed between the first mounting channel and the second mounting channel.

13. The photovoltaic blanket product of claim 10, wherein the photovoltaic blanket product is attached to a roof such that at least a portion of the photovoltaic module is supported above the roof's surface to allow air flow or water drainage under the photovoltaic module.

14. The photovoltaic blanket product of claim 10, wherein the first edge of the photovoltaic module is inserted within the mounting channel of the first mounting device so as to allow the photovoltaic module to slidingly expand or contract within the mounting channel.

15. The photovoltaic blanket product of claim 10, wherein either or both the mounting channel of the first mounting device or the mounting channel of the second mounting device comprise a plurality of teeth configured to grip the photovoltaic module to releasably secure the photovoltaic module within the channel.

16. A device for attaching a photovoltaic module to a structure comprising:
- a device body having a longitudinal length and a transverse length, the device body being couplable with the structure and including:
  - a top surface;
  - a bottom surface;
  - a first longitudinal edge;
  - a second longitudinal edge opposite the first longitudinal edge;
  - a first channel extending along at least a portion of the first longitudinal edge, the first channel being configured so that an edge of the photovoltaic module is insertable therein to attach the photovoltaic module to the structure;
  - a second channel extending along at least a portion of the second longitudinal edge, the second channel being configured so that an edge of a second photovoltaic module is insertable therein to attach the second photovoltaic module to the structure; and
  - a third channel extending along at least a portion of the top surface, the third channel being disposed between the first channel and the second channel, wherein the device body is foldable along the third channel.

17. The device of claim 16, further comprising a plurality of teeth disposed within the first channel, the plurality of teeth being configured to grip at least one surface of the photovoltaic module to releasably secure the photovoltaic module within the channel.

18. The device of claim 16, wherein at least a portion of the photovoltaic module is supported above the structure's surface when inserted within the device body.

* * * * *